US006969240B2

(12) United States Patent
Strangman

(10) Patent No.: US 6,969,240 B2
(45) Date of Patent: Nov. 29, 2005

(54) INTEGRAL TURBINE COMPOSED OF A CAST SINGLE CRYSTAL BLADE RING DIFFUSION BONDED TO A HIGH STRENGTH DISK

(75) Inventor: Thomas E. Strangman, Prescott, AZ (US)

(73) Assignee: Honeywell International Inc., Morristown, NJ (US)

(*) Notice: Subject to any disclaimer, the term of this patent is extended or adjusted under 35 U.S.C. 154(b) by 129 days.

(21) Appl. No.: 10/632,337

(22) Filed: Aug. 1, 2003

(65) Prior Publication Data
US 2005/0025613 A1 Feb. 3, 2005

(51) Int. Cl.$^7$ ................................. F01D 5/14
(52) U.S. Cl. .................. 416/234; 416/241 R; 416/189; 415/191; 415/200
(58) Field of Search .................. 415/191, 200; 416/241 R, 234, 189; 420/448; 148/312, 404, 427

(56) References Cited

U.S. PATENT DOCUMENTS

| | | |
|---|---|---|
| 3,494,709 A | 2/1970 | Piearcey |
| 3,793,010 A | 2/1974 | Lemkey et al. |
| 3,826,700 A | 7/1974 | Chu |
| 3,967,355 A | 7/1976 | Giamei et al. |
| 4,033,792 A | 7/1977 | Giamei et al. |
| 4,581,300 A | 4/1986 | Hoppin, III et al. |
| 4,605,452 A | 8/1986 | Gemma et al. |
| 4,813,470 A * | 3/1989 | Chiang .................... 164/122.1 |
| 4,915,907 A * | 4/1990 | Shah et al. ................. 420/448 |
| 4,921,405 A | 5/1990 | Wilson |
| 5,061,154 A | 10/1991 | Kington |
| 5,113,583 A | 5/1992 | Jenkel et al. |
| 5,304,039 A | 4/1994 | Corderman et al. |
| 5,843,586 A | 12/1998 | Schaeffer et al. |

* cited by examiner

Primary Examiner—Ninh H. Nguyen
(74) Attorney, Agent, or Firm—Robert Desmond, Esq.

(57) ABSTRACT

A lightweight high temperature bladed turbine disk intended for use in gas turbine engines. The bladed disk comprises a cast integral ring of single crystal airfoils with the primary and secondary crystallographic orientation being the same for each airfoil. Low-angle mismatch boundaries are present in the endwalls that couple adjacent airfoils. The cast ring of single crystal turbine blades is diffusion bonded to a high strength equiaxed disk. The resulting single crystal bladed disk is endowed superior performance, temperature capability, and lower weight and cost, relative to conventional turbines composed of individually cast single crystal blades, which are mechanically inserted into machined slots in the disk, or lower strength cast equiaxed blade rings that are diffusion bonded to a high strength turbine disk.

34 Claims, 6 Drawing Sheets

US 6,969,240 B2

INTEGRAL TURBINE COMPOSED OF A CAST SINGLE CRYSTAL BLADE RING DIFFUSION BONDED TO A HIGH STRENGTH DISK

BACKGROUND OF THE INVENTION

The present invention relates generally to bladed disk (blisk) turbine components and, more specifically, to a method and apparatus for making integral turbine components comprising a ring of single crystal airfoils with small angle grain boundaries located in the endwalls between adjacent airfoils.

Superalloy turbine disks are often used for commercial gas turbine engines. Commonly, turbine disks are machined from forged fine-grained equiaxed superalloy castings or from consolidated and forged superalloy powder. Disk alloy compositions are selected based on their combination of their resistance to creep and fatigue at temperatures below about 1400 degrees F. (760 degrees C.). Single crystal superalloys provide superior high temperature creep strength in the temperature range of 1400 F. (760 degrees C.) to 2100 F. (1149 degrees C.), and are consequently preferred for turbine airfoil applications. However, attempts to use single crystal airfoils in integral turbine bladed disks and nozzles have been hampered by inadequate grain boundary strength between adjacent single crystal airfoils, which necessitated unacceptably high manufacturing cost and high costs for casting and machining individual airfoils and bonding the individual airfoils into a bladed ring or nozzle. Prior art turbine blisks comprise individually cast blades that have machined fir tree or dovetail attachments which permit insertion into mating machined slots in the circumference of the rim of the disk. High temperatures and attachment stresses require machining the individual blades and slots to tight tolerances. This involves excessive labor and time. Dual alloy blisks composed of a cast equiaxed superalloy blade ring bonded to a high-strength disk alloy are also prior art. However, the cast equiaxed airfoils limit the temperature capability and performance of the turbine. Single crystal superalloys can maintain metal capabilities at temperatures of up to 100 degrees Fahrenheit (38 degrees C.) or more above the maximum temperature ranges of equiaxed materials.

None of the prior art is specifically intended for high performance applications under extreme conditions, and some suffer from one or more of the following disadvantages;
a) excessive mass and size.
b) inability to sustain high temperature conditions.
c) increased labor costs to address mechanical tolerances.
d) low creep strength at high temperatures.
e) short rupture life.
f) inadequate grain boundary strength between adjacent airfoils.
g) low casting yields.

As can be seen, there is a need for an improved apparatus and method for turbine components comprising single crystal airfoils with reduced crystallographic misorientation between adjacent airfoils, is lower in mass and size than prior art components, withstands higher temperatures and extreme conditions, has high creep strength and rupture life, high grain boundary strength between adjacent airfoils, and enables high casting yields and lower manufacturing cost.

SUMMARY OF THE INVENTION

In one aspect of the present invention, a turbine component comprises an integral ring of single crystal turbine airfoils, wherein each single crystal turbine airfoil has a defined primary (radial) and secondary (axial) crystal orientation, and a defined crystallographic mismatch between adjacent single crystal turbine airfoils.

In an alternative aspect of the present invention, a turbine component comprises an integral ring of single crystal turbine airfoils; wherein the average crystallographic orientation changes between adjacent single crystal turbine airfoils by 360/n degrees, where n is the number of single crystal turbine airfoils.

In another aspect of the present invention; a turbine component comprises an integral ring of single crystal turbine airfoils; wherein the crystallographic orientation changes between adjacent single crystal turbine airfoils alternate from zero degrees to approximately 360/(0.5n) degrees, where n is the number of single crystal turbine airfoils.

In yet another aspect of the present invention, an integral ring of single crystal turbine airfoils is manufactured by (a) positioning doubly oriented single crystal superalloy seed crystals into a desired orientation into a chilled base of an investment casting mold, (b) preheating the portion of the mold containing a pour cup, gating, integral blade ring pattern, and grain bridges, to a temperature above the liquidus of the single crystal superalloy, (c) maintaining the chilled surface of the single crystal superalloy seed crystals at a temperature below the solidus temperature of the superalloy, (d) casting into the investment casting mold molten superalloy at a temperature above the liquidus temperature of the superalloy, (e) establishing a thermal gradient, such that temperature increases from said superalloy seed crystals through the molten superalloy, and (f) moving the thermal gradient vertically through the investment casting mold to directionally solidify the superalloy within the integral blade ring in the axial direction.

In a further aspect of the present invention, a method for manufacturing an integral ring of single crystal turbine airfoils, comprises (a) positioning doubly oriented superalloy seed crystals into the desired orientation into a chilled base of an investment casting mold (b) preheating the portion of the mold containing the pour cup, gating, integral blade ring pattern, and grain bridges to a temperature above the liquidus of the single crystal alloy; during preheating the chilled surface of the superalloy seed crystals is maintained at a temperature below the solidus temperature of the metal; (c) casting into the investment casting mold molten superalloy at a temperature above the liquidus temperature of the metal, (d) establishing a thermal gradient, such that temperature increases from said superalloy seed crystals through said molten superalloy; and (e) moving the thermal gradient vertically through the mold to directionally solidify the superalloy within the integral ring in the axial direction.

In another aspect of the present invention, a method is also disclosed for manufacturing a single crystal bladed turbine disk, comprising (a) positioning doubly oriented superalloy seed crystals into the desired orientation into the chilled base of an investment casting mold, (b) preheating the portion of the mold containing the pour cup, gating (passages from the pour cup to the integral ring), blade ring pattern, and grain bridges (passages from the blade ring pattern to the seed crystals) to a temperature above the liquidus of the single crystal alloy; during preheating the chilled surface of the superalloy seed crystals is maintained at a temperature below the solidus temperature of the metal; and, (c) casting into the investment casting mold molten superalloy at a temperature above the liquidus temperature of the metal, (d) establishing a thermal gradient, such that temperature increases from said superalloy seed crystals through said molten metal, (e) moving the thermal gradient vertically through the mold to directionally solidify the superalloy within the integral ring in the axial direction, (f) removing the ceramic mold, gates and risers, (g) inserting the disk into the integral ring, (h) diffusion bonding the ring of single crystal turbine airfoils to the superalloy disk, and (i) heat treating the blisk at temperatures lower than the diffusion bonding temperature.

These and other aspects, objects, features and advantages of the present invention, are specifically set forth in, or will become apparent from, the following detailed description of a preferred embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention is useful for turbine components, including cast integral turbine nozzles and integral turbine bladed disks for use in all types of turbine engines, including, but not limited to, gas turbines used in aircraft, automotive, industrial power generation, and spacecraft. For illustrative purposes, the following description is of aircraft turbine components, however, it is to be understood that other applications can be substituted for the aircraft.

As used herein, a single crystal airfoil is one in which substantially all of the airfoil has a single crystallographic orientation through the load bearing portions, without the presence of high angle grain boundaries. A small amount of low angle grain boundaries, such as tilt or twist boundaries, are permitted within such a single crystal article, but are preferably not present. However, such low angle boundaries are often present after solidification and formation of the single crystal article, or after some deformation of the article during creep or other light deformation process. Other minor irregularities are also permitted within the scope of the term "single crystal." For example, small areas of high angle grain boundaries may be formed in various portions of the article, due to the inability of the single crystal to grow perfectly near corners and the like. Such deviations from a perfect single crystal, which are found in normal commercial production operations, are within the scope of the term "single crystal" as used herein. The method of this invention results in single crystal airfoils having at most minor irregularities.

Figure 1:
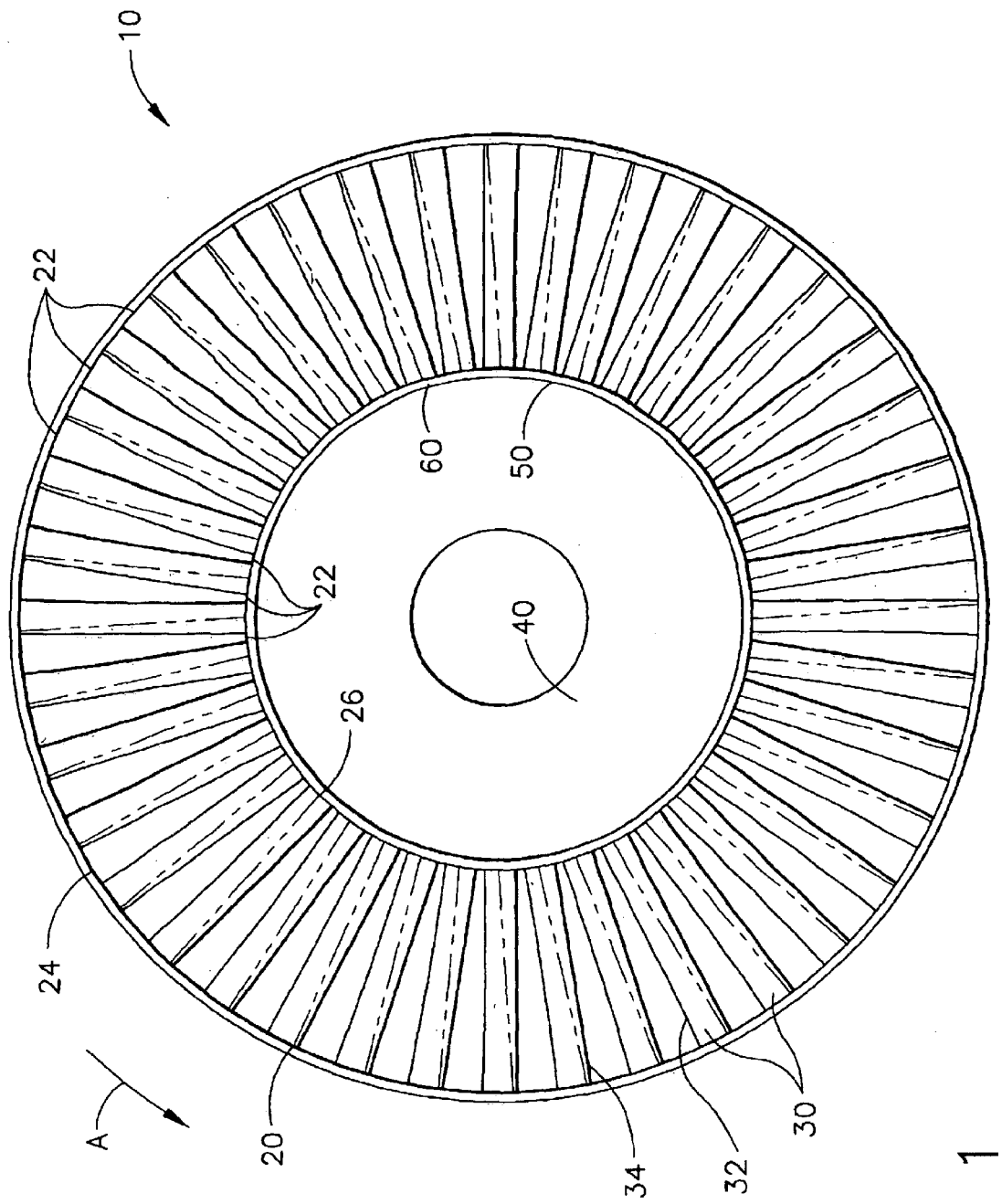
FIG. 1 is a an end view of a bladed turbine disk composed of single crystal airfoils, with reduced crystallographic misorientation between adjacent airfoils, according to an embodiment of the present invention.

The present invention generally provides a bimetallic bladed disk ("blisk") 10 composed of a cast single crystal integral ring 20 diffusion bonded to a turbine disk 40 as shown in FIG. 1, which may rotate in the direction indicated by arrow A. The blisk 10 comprises a plurality of single crystal airfoils 30. The integral ring of single crystal airfoils 20 can be used separately as a low-cost turbine nozzle 12, where the integral ring of single crystals 20 does not revolve. The ring of single crystal airfoils 20 may have a high-strength (low misorientation angle) grain boundary in the endwalls 22 that separate individual single crystal airfoils 30. The shroud may comprise the outer rim 24 of the integral ring of single crystals 20, while its platform may comprise the inner rim 26 of the integral ring of single crystals 20. Preferably, the average crystallographic orientation of adjacent single crystal airfoils 30 will vary by 360/n, where n is the number of single crystal airfoils 30. Due to manufacturing tolerances, the maximum change in crystallographic orientation, between adjacent single crystal airfoils 30, may be three degrees, in either direction, from the average crystallographic orientation of 360/n. The integral ring of single crystal airfoils 20 may be cast using doubly oriented seeds to control the primary and secondary orientation of each single crystal airfoil 30 and the endwalls 22.

As an alternative, a pair of single crystal airfoils 30 may be cast from only one seed. This would save the expense involved with using a separate seed for each single crystal airfoil 30. If one seed is used for casting each pair of single crystal airfoils 30, then the crystallographic orientation of adjacent single crystal airfoils 30 may alternate such that individual single crystal airfoils 30 (in each pair of single crystal airfoils 30 cast from one seed), would have the same crystallographic orientation (approximately zero degrees difference in crystallographic orientation), while the crystallographic orientation between adjacent pairs of single crystal airfoils 30 vary by 360/(0.5n), where n is the number of single crystal airfoils 30.

Junctions between adjacent single crystal airfoils 30 occur in the endwalls 22. For the preferred single crystal superalloy, CMSX®-486, this junction is a low angle grain boundary that has a negligible effect on the material stress-rupture and low-cycle fatigue strength. This is unlike the prior art, which usually relies on lower creep-strength equi-axed superalloys alloys or single crystal alloys. Prior art single crystal superalloys, such as CMSX®-3, have inadequate grain boundary strength in the endwalls 22 that connect the single crystal airfoils 30. The present invention reduces rejectable grain boundary defects as compared with conventional cast single crystal alloys. Thus, the casting yield and material properties are maximized.

Figure 2:
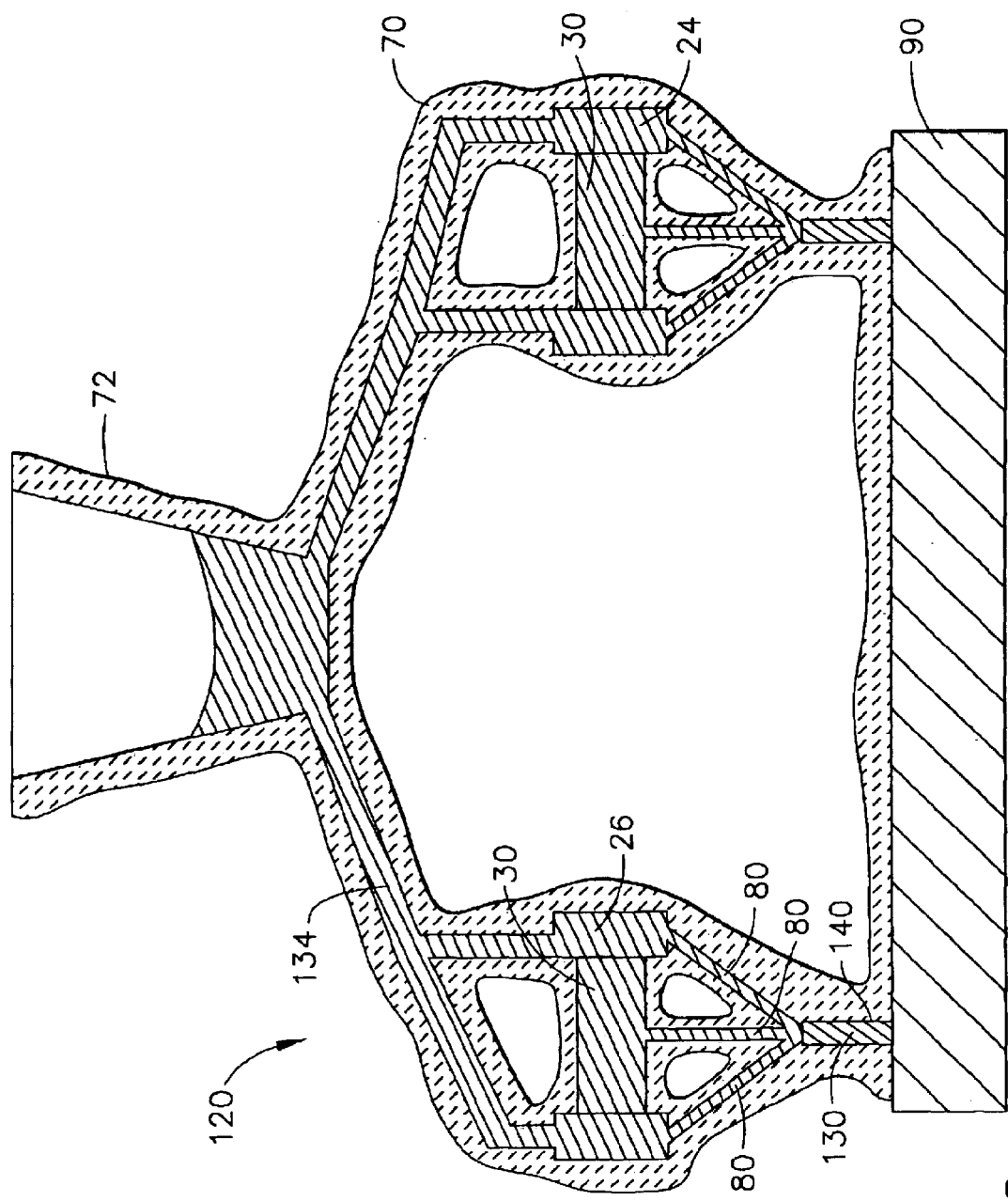
FIG. 2 is a side view in section of an investment casting mold used to manufacture an integral turbine component composed of single crystal airfoils, with reduced crystallographic misorientation between adjacent airfoils, according to an embodiment of the present invention.
Figure 3:
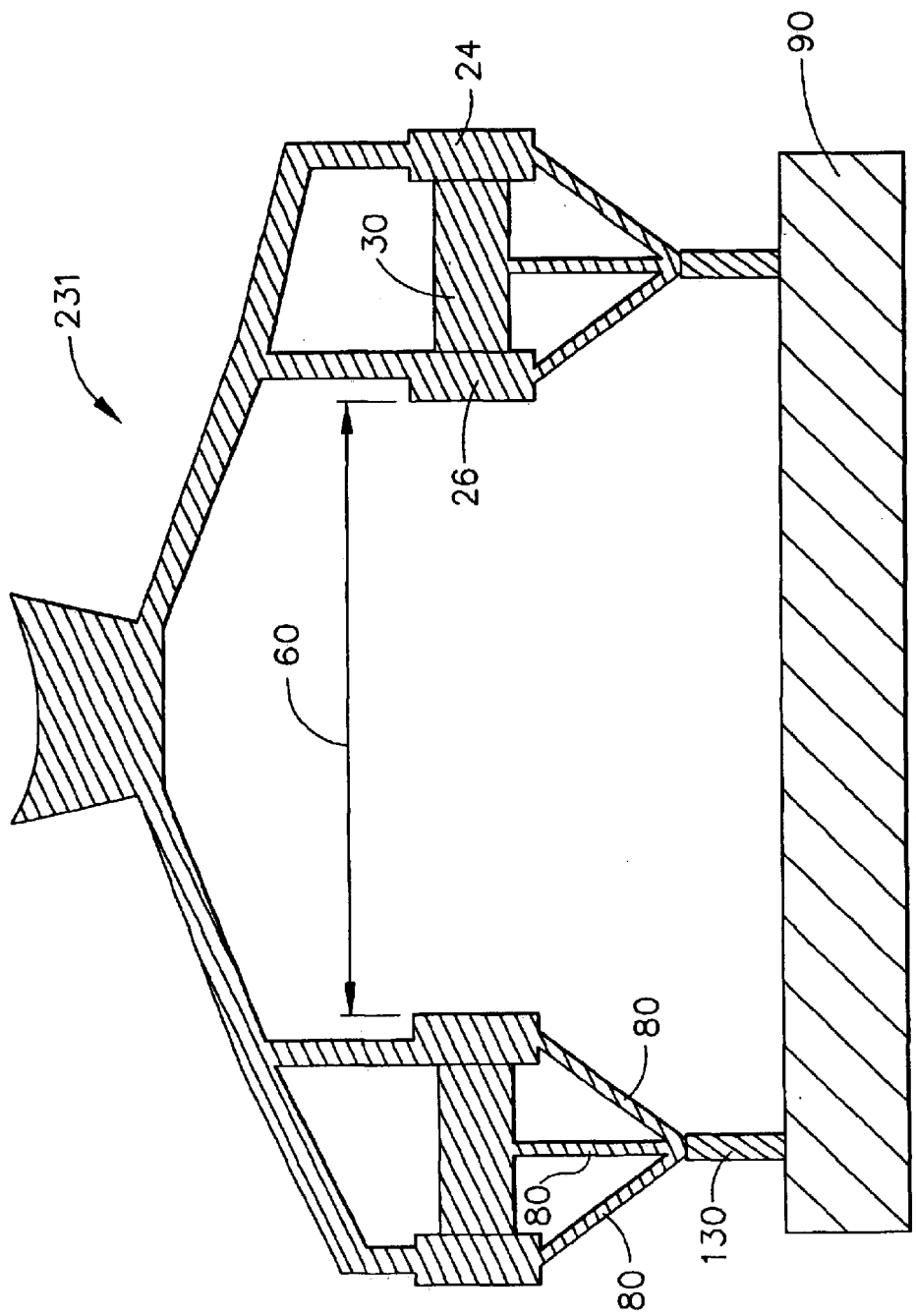
FIG. 3 is a side view in section of the integral turbine component composed of single crystal airfoils, with reduced crystallographic misorientation between adjacent airfoils, illustrated in FIG. 2, after solidification and removal of the investment casting mold, according to an embodiment of the present invention.
Figure 4:
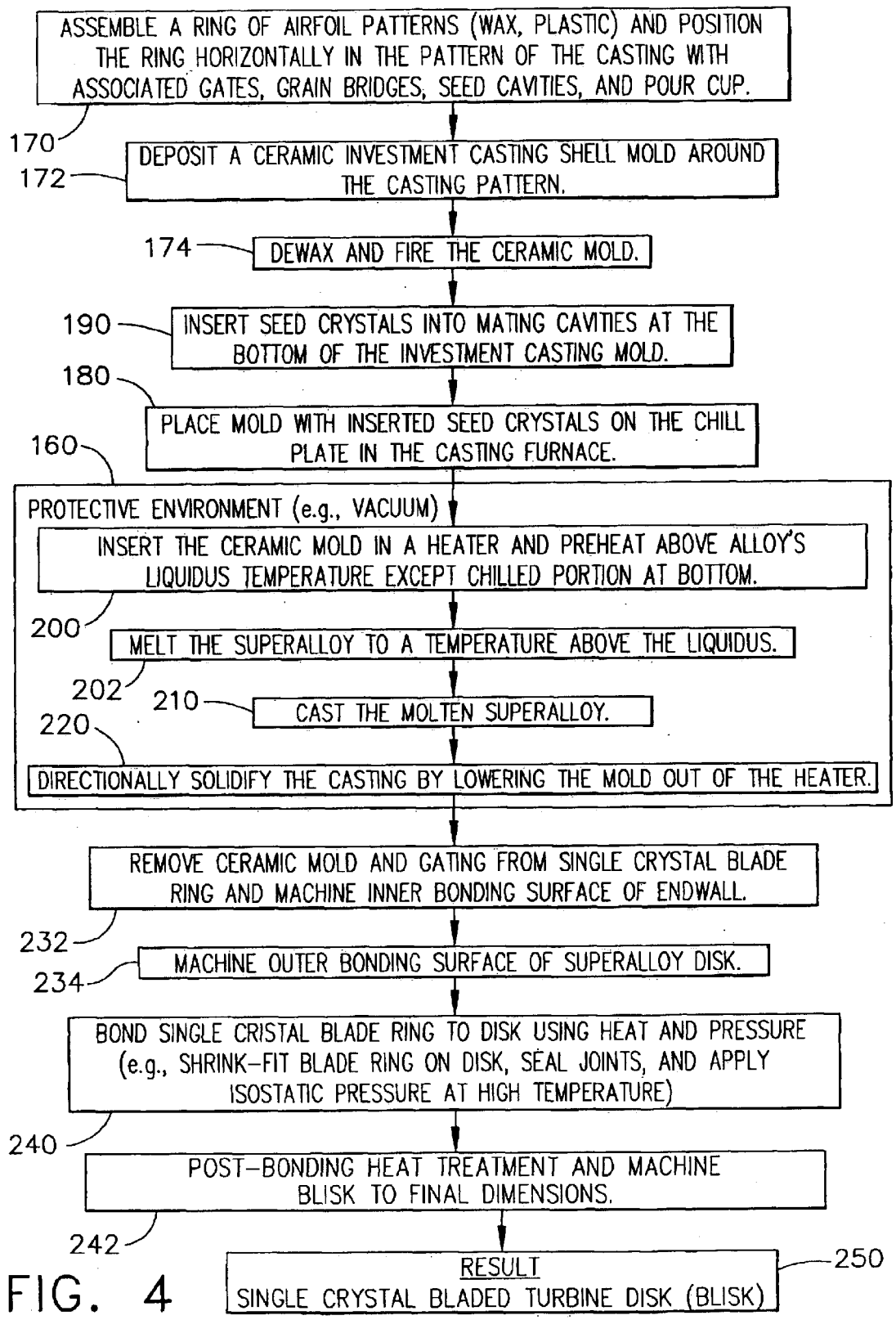
FIG. 4 is a flowchart demonstrating the investment casting process, according to an embodiment of the present invention.

The blisk 10 may be manufactured by an investment casting process as depicted in the flow diagram in FIG. 4 with reference to FIGS. 1 and 2. Initially, in step 170, a horizontal integral ring of airfoil patterns (typically composed of wax or plastic) may be assembled with patterns of the mating seed cavities 140, grain bridges 80 (passages from the blade ring pattern to the seed crystals), and gating 134 (passages from the pour cup 72 to the integral ring 20) to the pour cup 72. After the investment casting mold pattern has been assembled, a heat resistant ceramic shell 70 may be deposited on the mold pattern in step 172. After the shell has been deposited and dried, the shell may be dewaxed and burnt out to remove any residue of the pattern in step 174. Next, step 190 may follow in which alloy seed crystals 130 may be inserted into mating cavities 140 at the bottom of the investment casting mold. The alloy seed crystals 130 are oriented to define the primary (radial) and secondary (axial) crystallographic orientation of the single crystal airfoils 30. The primary [100] orientation of the seed crystals 130 may be selected so that the stacking axis of the turbine blade, which is aligned with the (horizontal) radius of the integral ring, is [100] for maximum creep strength. Thermomechanical fatigue resistance of the turbine airfoil may be enhanced by selecting the secondary [001] orientation of the seed to be parallel with the trailing edge 32 (as opposed to the leading edge 34) of the single crystal airfoil 30. Alternatively, the secondary [001] orientation of the seed crystals 130 can be vertical (parallel to the solidification direction) to maximize the casting yield. Step 180 may be conducted next in which the investment casting mold 70, containing the seed crystals 130, is attached onto a cooled chill plate 90. In step 160, the investment casting mold may then be placed into a protective environment, for example, a vacuum chamber. In step 200 the investment casting mold 70, containing the seed crystals 130 and the attached chill plate 90, may be inserted into a mold heater (not shown), such as a furnace, which preheats the mold 70 to a temperature above the liquidus temperature of the superalloy, with the exception of the portion containing the seed crystals 130, which is maintained at a temperature below the solidus temperature of the superalloy. The superalloy may be melted in a crucible (not shown) in step 202 to a temperature above the liquidus temperature of the superalloy. Melting of the superalloy is typically conducted with an induction heating coil (not shown) that stirs the superalloy as it melts. After steps 200 and 202 have been performed, the molten alloy may be cast into the mold 70 in step 210 by pouring molten superalloy into the investment casting mold 70 through the pour cup 72. After casting, the investment casting mold 70 may be removed vertically out of the mold heater (not shown) in step 220, which may result in a moving thermal gradient that enables directional solidification of the casting. Directional solidification in the gradient may enable the seed crystals 130 to grow into the airfoil cavities, resulting in single crystal airfoils 30 with grain boundaries in endwalls 22. After the investment casting 120 has cooled, it may next be removed from the protective environment. In step 232, the investment casting mold 70, grain bridges 80, and gatings 134 may be removed from the solidified casted ring 231. The inside diameter 60 of the integral ring 20 endwall 22 may be machined to enable bonding to the disk 40.

The outer diameter 50 of the mating disk 40 may be machined in step 234.

As shown in FIG. 1, the single crystal bladed blisk 10 may be created by diffusion bonding the inner diameter 60, of the integral ring of single crystal airfoils 20, to the outer diameter 50 of the high strength disk alloy turbine disk 40. As depicted in step 240 in FIG. 4, the integral ring of single crystal blades 20 may be bonded to the turbine disk 40 using heat and pressure. One exemplary method to bond the ring of single crystal airfoils 20 to the disk 40 may be by shrink-fitting the ring 20 to the disk, evacuating and sealing the joined surfaces, and bonding with hot isostatic pressure. Suitable turbine disk alloys that can be diffusion bonded to the single crystal integral ring 20 include Astroloy, U720, and Alloy 10. After diffusion bonding, the blisk 10 may be heat treated at temperatures below the bonding temperature and machined to final dimensions in step 242. The end result in step 250 may be a blisk 10 that has superior properties, relative to existing integral turbine blisks.

Suitable materials for the integral ring of single crystal airfoils 20 may be comprised of investment cast nickel superalloys that contain sufficient grain boundary strengthening elements (Hf, C, B, Zr) for superior tolerance to low angle grain boundaries. It will be understood that the single crystal superalloy material has anisotropic properties. Thus as an example, in the normal crystal structure (face centered cubic) which applies to superalloys of this sort, the value of Young's modulus is high in the [111] direction, lower in the [110] direction and at its lowest in the [100], [010], [001] directions. An example of a suitable material for the integral ring of single crystal airfoils 20 is the nickel-based CMSX-486® superalloy, as manufactured by the Cannon-Muskegon Corporation of 2875 Lincoln Street, Muskegon, Mich. 49441. The CMSX-486® superalloy may be comprised of 61.41 weight percent nickel, 9.3 weight percent cobalt, 5.0 weight percent chromium, 8.6 weight percent tungsten, 4.5 weight percent tantalum, 0.7 weight percent molybdenum, 3.0 percent rhenium, 5.7 weight percent aluminum, 0.7 weight percent titanium, 1.0 weight percent hafnium, 0.07 weight percent carbon, 0.015 weight percent boron, and 0.005 weight percent zirconium.

Figure 5:
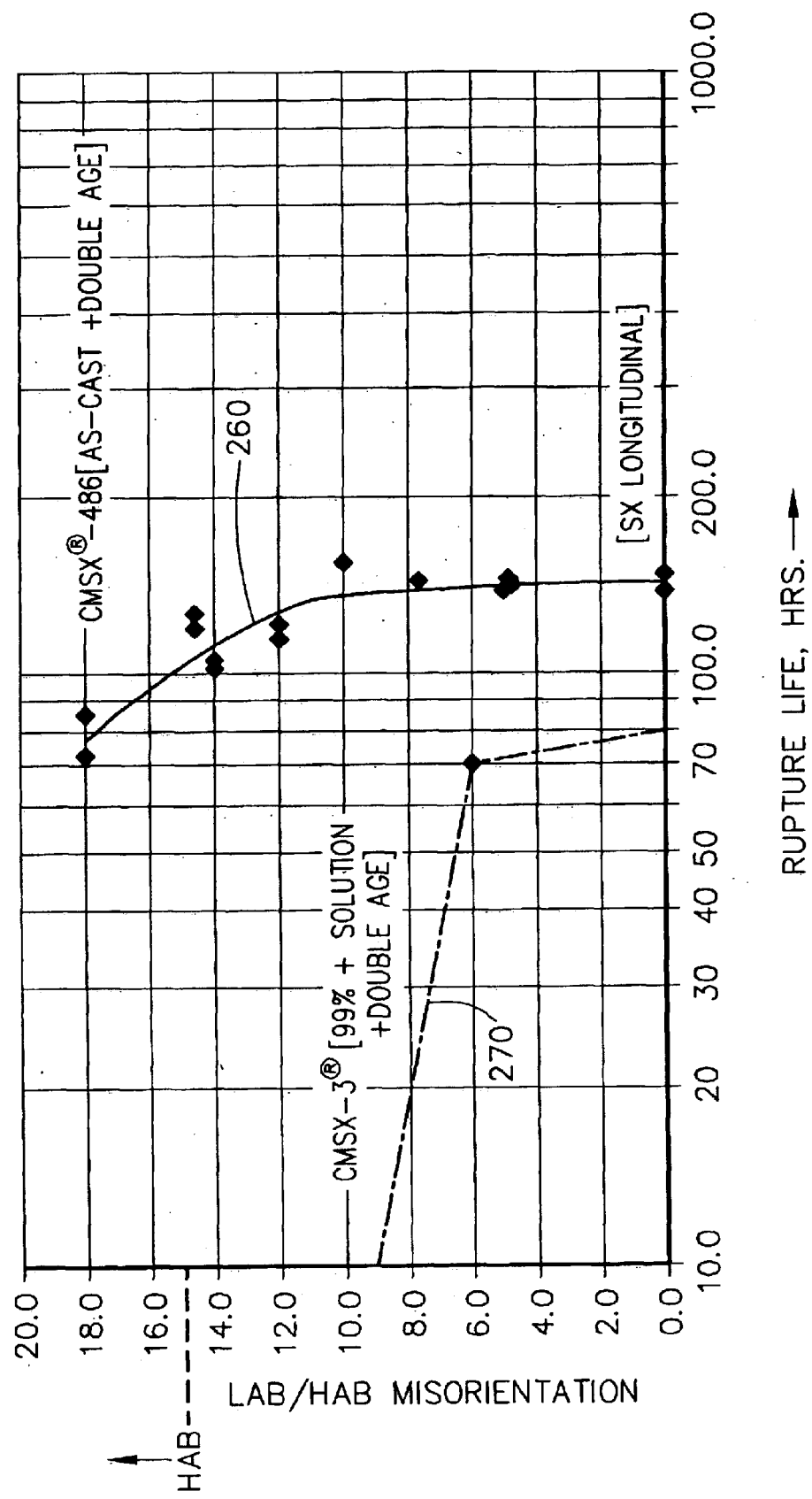
FIG. 5 is a graph illustrating stress-rupture lives of single crystal alloys as a function of low angle grain boundary/high angle grain boundary misorientation.
Figure 6:
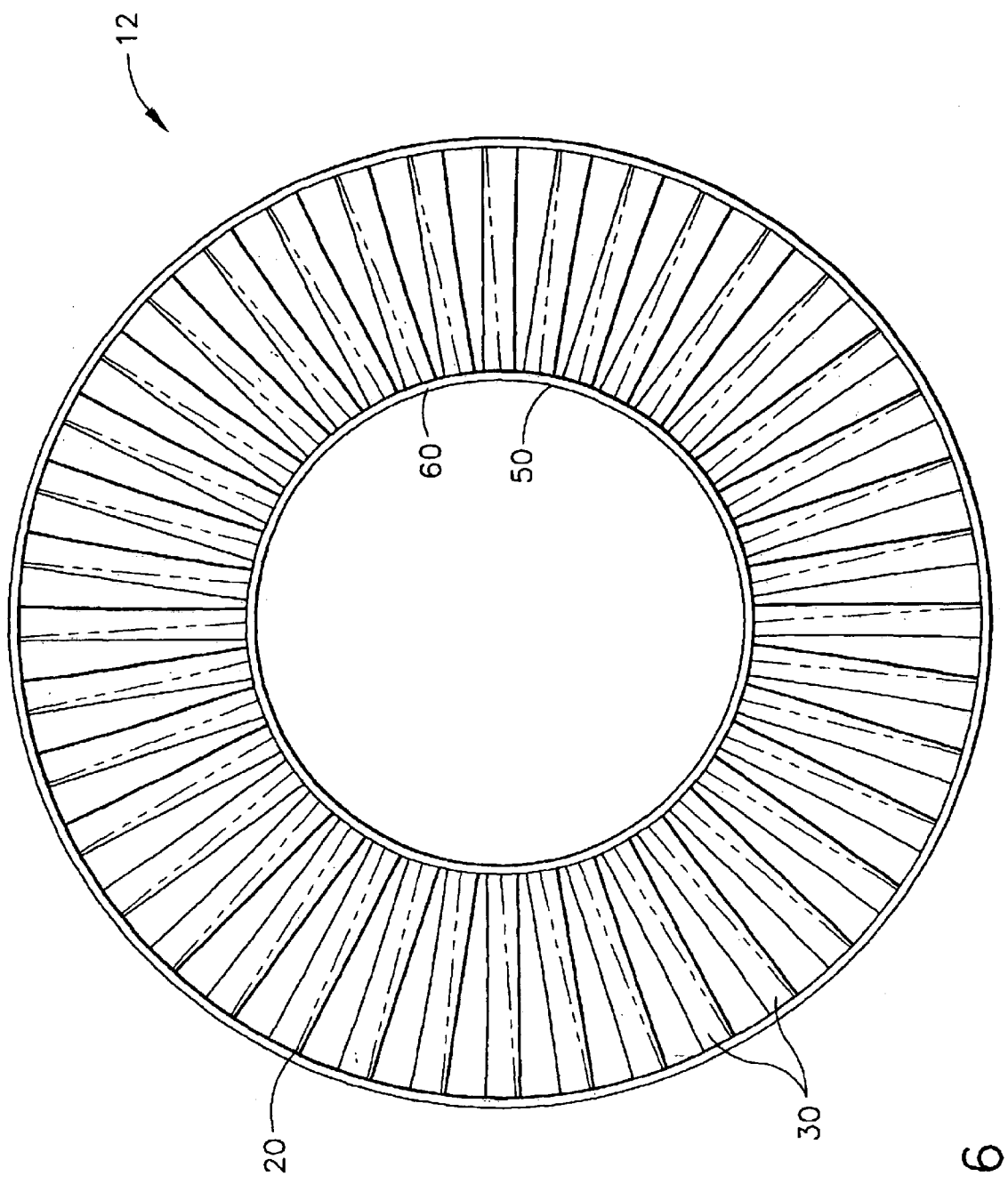
FIG. 6 is an end view of a nozzle composed of single crystal airfoils, with reduced crystallographic misorientation between adjacent airfoils, according to an embodiment of the present invention.

The benefits of the CMSX-486® superalloy can be seen in FIG. 5. The graph is a quantitative representation of low angle grain boundary (LAB) or high angle grain boundary (HAB) present/misorientation (degrees) versus stress-rupture life (hours) under a selected constant temperature and constant load condition. Misorientation is measured in the number of degrees in variance relative to ideal crystallographic orientation. For example, if a grain boundary varies 16 degrees from the [001] crystallographic orientation, than the misorientation is 16 degrees. The relationship between alloy rupture life and low angle boundary/high angle boundary misorientation is depicted for the CMSX-486® superalloy 260 and for another superalloy, CMSX-3® 270, also manufactured by the Cannon-Muskegon Corporation. If the CMSX-3® superalloy is used in the ideal situation of no misorientation, then rupture life may reach 80 hours, as shown by plot 270 in FIG. 5. In this ideal situation, the CMSX-486® superalloy is superior to the CMSX-3® superalloy, reaching up to 150 hours rupture life as shown by plot 260 in FIG. 5. Furthermore, the CMSX-486® superalloy exhibits longer rupture life than for various conditions using the CMSX-3® superalloy. For example, for low angle boundary/high angle boundary misorientation above about 6.0 degrees, the CMSX-3® superalloy exhibits short rupture life, down to 10 hours of rupture life at about 9.0 degrees. However, the CMSX-486® superalloy does not experience a rupture life shorter than about 70 hours at low angle boundary/high angle boundary misorientations as high as about 18.0 degrees. Indeed, the CMSX-486® superalloy maintains a rupture life of about the maximum (150 hours) for low angle boundary/high angle boundary misorientations from zero to about 10.0 degrees, while the CMSX-3® superalloy rupture life rapidly decreases at allow angle boundary/high angle boundary misorientation of about 6.0 degrees. As one skilled in the art can appreciate, the CMSX- 486® superalloy has outstanding tolerance for misoriented grain boundaries, which enables the development of superior seeded cast integral nozzles and integral rings. Additionally, the CMSX-486® superalloy does not require a solution heat treatment, which enables a high casting yield due to negligible recrystallization losses.

The present invention may comprise coatings, such as, thermal barrier coatings.

Although the present invention has been described in considerable detail with reference to certain preferred versions thereof, other versions are possible. Therefore, the spirit and scope of the appended claims should not be limited to the description of the preferred versions contained therein.

I claim:

1. A turbine component comprising:
   an integral ring of single crystal turbine airfoils;
   wherein each airfoil has a defined primary (radial) and secondary (axial) crystal orientation; and
   a defined crystallographic mismatch between adjacent single crystal turbine airfoils.
2. The turbine component of claim 1, wherein the turbine component has anisotropic properties.
3. The turbine component of claim 1, wherein grain boundary misorientations between adjacent single crystal turbine airfoils are as high as about 18.0 degrees.
4. The turbine component of claim 1, wherein the turbine component comprises a nozzle.
5. The turbine component of claim 1, wherein the turbine component comprises a bladed turbine disk.
6. The turbine component of claim 5, wherein a secondary orientation of at each single crystal turbine airfoil is approximately parallel to the trailing edge of each single crystal turbine airfoil.
7. The turbine component of claim 1, wherein the turbine component comprises a thermal barrier coating.
8. The turbine component of claim 5, wherein a primary orientation of each single crystal blade is approximately aligned with the radius of the bladed ring.
9. A turbine component comprising:
   an integral ring of single crystal turbine airfoils;
   wherein the average crystallographic orientation changes between adjacent single crystal turbine airfoils by 360/n degrees, where n is the number of single crystal turbine airfoils.
10. The turbine component of claim 9, wherein the turbine component has anisotropic properties.
11. The turbine component of claim 9, wherein the change in crystallographic orientation, between adjacent single crystal airfoils, does not exceed three degrees, in either direction, from the average crystallographic orientation of 360/n.
12. The turbine component of claim 9, wherein the turbine component comprises a nozzle.
13. The turbine component of claim 9, wherein the turbine component comprises a bladed turbine disk.
14. The turbine component of claim 13, wherein a primary [100] orientation of each single crystal blade is approximately aligned with the radius of the bladed disk.
15. The turbine component of claim 13, wherein a secondary [001] orientation of each single crystal turbine airfoil is approximately parallel to the trailing edge of the single crystal turbine airfoil.
16. The turbine component of claim 15, wherein the secondary [001] orientation of each single crystal turbine airfoil is parallel to the trailing edge of the single crystal turbine airfoil.
17. The turbine component of claim 13, wherein a secondary [001] orientation of the airfoils is approximately parallel to the integral ring axis.
18. The turbine component of claim 13, wherein a primary [100] orientation of each single crystal turbine airfoil is aligned with the radius of the bladed ring.
19. The turbine component of claim 9, wherein the turbine component comprises a thermal barrier coating.
20. A turbine component comprising:
    an integral ring of single crystal turbine airfoils;
    wherein the crystallographic orientation changes between adjacent single crystal turbine airfoils alternate from zero degrees to approximately 360/(0.5n) degrees, where n is the number of single crystal turbine airfoils.
21. The turbine component of claim 20, wherein the turbine component has anisotropic properties.
22. The turbine component of claim 20, wherein the turbine component comprises a nozzle.
23. The turbine component of claim 20, wherein the turbine component comprises a bladed turbine disk.
24. The turbine component of claim 23, wherein a primary [100] orientation of each single crystal blade is approximately aligned with the radius of the bladed disk.
25. The turbine component of claim 23, wherein a secondary [001] orientation of each single crystal turbine airfoil is approximately parallel to the trailing edge of the single crystal turbine airfoil.
26. The turbine component of claim 23, wherein a secondary [001] orientation of the airfoils is approximately parallel to the integral ring axis.
27. The turbine component of claim 20, wherein the turbine component comprises a thermal barrier coating.
28. An integral ring of single crystal turbine airfoils manufactured by:
    (a) positioning doubly oriented single crystal superalloy seed crystals into a desired orientation into a chilled base of an investment casting mold;
    (b) preheating the portion of the mold containing a pour cup, gating, blade ring pattern, and grain bridges, to a temperature above the liquidus of the single crystal superalloy;
    (c) maintaining the chilled surface of the single crystal superalloy seed crystals at a temperature below the solidus temperature of the superalloy;
    (d) casting into the investment casting mold molten superalloy at a temperature above the liquidus temperature of the superalloy;
    (e) establishing a thermal gradient, such that temperature increases from said superalloy seed crystals through the molten superalloy; and
    (f) moving the thermal gradient vertically through the investment casting mold to directionally solidify the superalloy within the integral ring in the axial direction, wherein adjacent airfoils have grain boundary misorientations as high as about 18.0° and wherein the integral ring comprises:
    an inner rim,
    a plurality of airfoils integral with the inner rim, and
    an outer rim integral with the inner rim and with the plurality of airfoils.
29. The integral ring of single crystal turbine airfoils of claim 28, wherein the integral ring of single crystal turbine airfoils has anisotropic properties.

30. An integral ring of single crystal turbine airfoils manufactured by:
   (a) positioning doubly oriented single crystal superalloy seed crystals into a desired orientation into a chilled base of an investment casting mold;
   (b) preheating the portion of the mold containing a pour cup, gating, blade ring pattern, and grain bridges, to a temperature above the liquidus of the single crystal superalloy;
   (c) maintaining the chilled surface of the single crystal superalloy seed crystals at a temperature below the solidus temperature of the superalloy;
   (d) casting into the investment casting mold molten superalloy at a temperature above the liquidus temperature of the superalloy;
   (e) establishing a thermal gradient, such that temperature increases from said superalloy seed crystals through the molten superalloy; and
   (f) moving the thermal gradient vertically through the investment casting mold to directionally solidify the superalloy within the integral ring in the axial direction, where adjacent airfoils have grain boundary misorientations as high as about 18.0 degrees.

31. The integral ring of single crystal turbine airfoils of claim 30, wherein the single crystal superalloy composition comprises of 61.41 weight percent nickel, 9.3 weight percent cobalt, 5.0 weight percent chromium, 8.6 weight percent tungsten, 4.5 weight percent tantalum, 0.7 weight percent molybdenum, 3.0 percent rhenium, 5.7 weight percent aluminum, 0.7 weight percent titanium, 1.0 weight percent hafnium, 0.07 weight percent carbon, 0.015 weight percent boron, and 0.005 weight percent zirconium.

32. A turbine component comprising:
   a turbine disk; and
   a single crystal integral ring comprising nickel or a nickel-based superalloy, wherein said single crystal integral ring is diffusion bonded to an outer portion of said turbine disk, wherein said single crystal integral ring comprises:
   an inner rim,
   a plurality of airfoils integral with said inner rim, the average crystallographic orientation between adjacent members of said plurality of airfoils varying by 360/n degrees, where n is the number of said airfoils, and
   an outer rim integral with said inner rim and with said plurality of airfoils.

33. A turbine component, comprising:
   a single crystal integral ring including:
      an inner rim, and
      a plurality of airfoils, each of said plurality of airfoils formed integrally with said inner rim, wherein:
         each of said plurality of airfoils is grown from a separate seed crystal.

34. The turbine component of claim 33, further comprising an outer rim, said outer rim integral with said plurality of airfoils and with said inner rim, wherein:
   each of said outer rim, said inner rim, and said plurality of airfoils comprises a nickel-based superalloy.

* * * * *